(12) United States Patent
Saito

(10) Patent No.: US 8,596,831 B2
(45) Date of Patent: Dec. 3, 2013

(54) LIGHT BEAM CONTROLLING MEMBER AND OPTICAL DEVICE INCLUDING LIGHT BEAM CONTROLLING MEMBER

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 105 days.

(21) Appl. No.: 13/250,601

(22) Filed: Sep. 30, 2011

(65) Prior Publication Data

US 2012/0081910 A1    Apr. 5, 2012

(30) Foreign Application Priority Data

Oct. 5, 2010  (JP) .................................. 2010-225604
Mar. 3, 2011  (JP) .................................. 2011-046126

(51) Int. Cl.
*F21V 5/00*     (2006.01)
*F21V 5/04*     (2006.01)
*F21V 5/02*     (2006.01)

(52) U.S. Cl.
USPC ........... 362/326; 362/327; 362/332; 362/339; 362/308; 362/309

(58) Field of Classification Search
USPC ............ 362/520–522, 222, 223, 244, 311.06, 362/326, 330, 332, 339; 359/720, 743, 457, 359/742
See application file for complete search history.

(56) References Cited

U.S. PATENT DOCUMENTS

| | | | |
|---|---|---|---|
| 4,337,759 A * | 7/1982 | Popovich et al. ............. 126/684 |
| 4,755,921 A * | 7/1988 | Nelson .......................... 362/348 |
| 6,407,860 B1 * | 6/2002 | Funazaki et al. .............. 359/743 |
| 6,947,225 B2 * | 9/2005 | Sekiguchi et al. ............ 359/742 |
| 7,746,570 B2 * | 6/2010 | Suzuki et al. ................. 359/742 |
| 2003/0058532 A1 * | 3/2003 | Suzuki et al. ................. 359/455 |
| 2011/0261569 A1 * | 10/2011 | Kayanuma .................... 362/339 |
| 2011/0286221 A1 * | 11/2011 | Saito ........................ 362/311.06 |

FOREIGN PATENT DOCUMENTS

JP   2007-134316 A   5/2007

* cited by examiner

*Primary Examiner* — Mariceli Santiago
(74) *Attorney, Agent, or Firm* — DLA Piper LLP (US)

(57) ABSTRACT

In a light beam controlling member, a projecting section has a third surface between a first surface (incident surface) and a second surface (total reflection surface). The third surface is formed into an angled surface that is angled in relation to an optical axis, of which one end section joined with the first surface is positioned further to a light source side than another end section joined with the second surface. The overall light that has entered the third surface of each of a plurality of projecting sections is refracted by the third surface towards an exit surface side with positive power.

7 Claims, 14 Drawing Sheets

US 8,596,831 B2

LIGHT BEAM CONTROLLING MEMBER AND OPTICAL DEVICE INCLUDING LIGHT BEAM CONTROLLING MEMBER

TECHNICAL FIELD

The present invention relates to a light beam controlling member and an optical device including the light beam controlling member. In particular, the present invention relates to a light beam controlling member suitable for irradiating light emitted from a light source onto a surface to be irradiated, and an optical device including the light beam controlling member.

BACKGROUND ART

As a light beam controlling member suitable for reduced thickness and reduced weight, a light beam controlling member (so-called Fresnel lens) has been known since the past in which an incident area for light is formed having a serrated cross-sectional shape (referred to, hereinafter, as a Fresnel shape) divided into a plurality of divided areas having a concentric circular ring shape (orbicular). This type of light beam controlling member has been used, for example, in applications where thinness is particularly advantageous, and in applications where effects caused by generation of unnecessary light can be ignored (such as in magnifying glasses and lighting systems) (refer to, for example, Patent Literature 1).

When this type of light beam controlling member is assembled into a product for illumination purposes, a light source, such as a light emitting diode (LED), is positioned on the incident area side that is formed into the Fresnel shape, such that a center axis of the light emitted from the light source is coaxial with an optical axis of the light beam controlling member, and fixed thereto.

The Fresnel shape in this type of light beam controlling member may be a type including only a refractive surface that refracts the light emitted from the light source, or a type including a reflective surface in addition to the refractive surface. The latter type is more advantageous than the former in terms of efficiently capturing the light emitted from the light source (such as the LED) with a large spread angle.

Here, FIG. 11 is a diagram of an example of a conventional design for a light beam controlling member 1 including a reflective surface of this type.

As shown in FIG. 11, the light beam controlling member 1 is configured by a disk-shaped light beam controlling section 2 including an optical axis OA that contributes to light beam control, and a cylindrical edge section 3 surrounding the light beam controlling section 2. The light beam controlling member 1 can be integrally formed using a mold, such as by an injection molding method using a transparent resin material, such as poly(methyl methacrylate) (PMMA), polycarbonate (PC), cyclo-olefin resin (COP), epoxy resin (EP), or silicon resin.

As shown in FIG. 11, the light beam controlling section 2 has two light beam controlling surfaces 4 and 5 that are an incident area 4 and an exit area 5. The incident area 4 and the exit area 5 face each other in the optical axis OA direction. In addition, the light beam controlling section 2 of the light beam controlling member 1 shown in the cross-sectional view in FIG. 11 has a circular shape from a planar view.

Here, as shown in FIG. 11, light L that has been emitted from a light source 6, such as an LED, enters the incident area 4. The light source 6 is disposed in a position facing the incident area 4 on the optical axis OA However, the light source 6 is configured to emit, towards the light beam controlling member 1 side, light L having a predetermined spread angle in relation to the optical axis OA direction. In addition, the center axis of the light L emitted from the light source 6 is aligned with the optical axis OA of the light beam controlling member 1 in the design. In FIG. 11, only the optical path of the light L emitted from a single light emission point on the optical axis OA in the light source 6 is shown. However, in actuality, surface emission is performed in the overall light source 6.

On the other hand, the light L from the light source 6 that has entered the incident area 4 travels the interior of the light beam controlling section 2 and enters the exit area 5 from within the light beam controlling section 2 (internal incidence). The internally incident light L is emitted from the exit area 5 towards the surface to be irradiated.

The incident area 4 will be described in further detail. As shown in FIG. 11, the incident area 4 includes a circular center section 8 of which the center is the optical axis OA, and a plurality of projecting sections 11 surrounding the center section 8.

As shown in FIG. 11, the plurality of projecting sections 11 are adjacent to each other in a radial direction (horizontal direction in FIG. 11).

The projecting sections 11 form concentric circular ring shapes of which the center is the optical axis OA, when viewed from the optical axis OA direction. In addition, as shown in FIG. 11, the projecting sections 11 form a serrated cross-sectional shape in the optical axis OA direction (vertical cross-sectional shape), configuring the Fresnel shape as a whole.

Furthermore, as shown in an enlarged cross-sectional view in FIG. 12, each projecting section 11 has a first surface 14 and a second surface 15. The second surface 15 is formed in a position on the outer side in the radial direction with reference to the optical axis OA (inner end in the radial direction), in relation to the first surface 14. The first surface 14 is formed into a cylindrical surface of which the center is the optical axis OA. On the other hand, the second surface 15 is formed into an angled surface (tapered surface) of which the center axis is the optical axis OA, having a tilt angle that is a predetermined acute angle in relation to the optical axis OA, such as to tilt to the optical axis OA side towards the light source 6 side (lower side in FIG. 12). The first surface 14 and the second surface 15 are joined together at the respective tip end sections (lower end sections in FIG. 12).

Here, the light L emitted from the light source 6 enters the first surface 14 and is then refracted by the first surface 14 towards the second surface 15 side.

On the other hand, the light L from the light source 6 that has been refracted by the first surface 14 enters the second surface 15 from within the projecting section 11 at an angle of incidence that is a critical angle or more. The incident light L is totally reflected by the second surface 15 towards the exit area 5 side, or in other words, the surface to be irradiated.

The second surface 15 is formed having a rotationally symmetrical shape of which the symmetry axis is the optical axis OA. Therefore, a conical light is emitted in the optical axis OA direction from the overall second surface 15.

The light that has been totally reflected by the second surface 15 as described above reaches the exit area 5 and is emitted from the exit area 5 towards the surface to be irradiated.

In the light beam controlling member 1 configured as described above, the light emitted from the light source 6 can be efficiently captured by the first surface 14 of the sharp projecting section 11 that has been formed having sufficient height in the optical axis OA direction (such as 0.1 mm). Light beam control can be performed such that most of the captured light is totally reflected by the second surface 15 onto an optical path towards the surface to be irradiated. As a result, desired light distribution characteristics can be achieved.

Patent Literature 1: Japanese Patent Publication No. 2007-134316

DISCLOSURE OF INVENTION

Problem to be Solved by the Invention

However, when the light distribution characteristics of the light beam controlling member 1 shown in FIG. 11 and FIG. 12 are set as the ideal light distribution characteristics (in terms of design) and the light beam controlling member 1 is actually formed using a mold to achieve the ideal light distribution characteristics, insufficient filling of resin material may occur in a transfer surface of the tip end section of the projecting section 11 in the mold.

In a light beam controlling member 1 that is actually formed when insufficient filling such as that described above occurs, as shown in FIGS. 13 and 14, for example, the height of the projecting section 11 (first surface 14) becomes shorter by, for example, 85% in relation to the designed height. In addition, an edge that should have been formed is not formed in the tip end section of the projecting section 11. A molding defect section is formed instead, such as a circular arc-shaped section or a curved section.

Here, in the light beam controlling member 1' shown in FIGS. 13 and 14, as a result of the molding defect section in the tip end section of the projecting section 11 acting as a lens surface, incident light that has entered the molding defect section is converged near the center of the curvature. The converged light does not enter the second surface 15, but rather travels in a direction differing from a normal optical path of total reflection by the second surface 15 and becomes unnecessary light (stray light) that is not irradiated onto the surface to be irradiated (effective irradiated area). As a result, the light distribution characteristics that are achieved deteriorate from the ideal light distribution characteristics. In the light beam controlling member 1' such as this, sufficient illumination intensity cannot be achieved in the irradiated area by the emitted light.

The deterioration of the light distribution characteristics such as that described above is a significant issue in terms of efficient use of light from the light source, in addition to achieving the desired light distribution characteristics.

Here, because this issue occurs because of the difficulty in transferring the excessively sharp shape of the projecting sections 11 from the mold during formation, it is thought that the issue can be easily resolved by designing the shape of the projecting sections 11 for favorable reproduction of the mold shape to prevent insufficient filling from occurring in the first place.

Therefore, from this perspective, a light beam controlling member 1" in which the filling capability of resin material has been improved, as shown in FIG. 15 and FIG. 16, for example, is not difficult to conceive. In the light beam controlling member 1", the tip end section of the projecting section 11 of the light beam controlling member 1 shown in FIG. 11 and FIG. 12 is simply cut on a cutting-plane line that is perpendicular to the optical axis OA. Because the tip end section of the projecting section 11 is flat, the light beam controlling member 1" is capable of appropriately filling the transfer surface of the tip end section with the resin material.

However, although the light beam controlling member 1" such as that described above responds to the above-described issue in terms of suppressing deterioration of the designed light distribution characteristics caused by insufficient filling of the resin material, the light that has entered the tip end section (flat section) of the projecting section 11 does not enter the second surface 15, but rather travels in a direction differing from the normal optical path (refer to the broken line section in FIG. 16) of total reflection by the second surface 15, and becomes unnecessary light that is not irradiated onto the surface to be irradiated. Therefore, in a manner similar to the light beam controlling member 1' shown in FIG. 13 and FIG. 14, the light distribution characteristics that are achieved differ from the targeted light distribution characteristics.

Therefore, even if the issue regarding insufficient filling of the resin material can be resolved by simply relaxing the sharpness of the projecting section 11 as shown in FIG. 15 and FIG. 16, the issue regarding deterioration of the light distribution characteristics as a result of stray light persists.

Therefore, the present invention has been achieved in light of the above-described issues. An object of the present invention is to provide a light beam controlling member capable of easily suppressing deterioration of light distribution characteristics caused by unnecessary light with certainty, using a design that is not difficult to manufacture, and an optical device including the light beam controlling member.

Means for Solving Problem

To achieve the above-described object, a light beam controlling member according to a first aspect of the present invention is a light beam controlling member including: an incident area into which light emitted from a light source enters; and an exit area positioned on a side opposite to the incident area in an optical axis direction that emits the light that has entered the incident area towards a surface to be irradiated. The incident area has a plurality of projecting sections that are adjacent to one another in a radial direction, such that a shape when viewed from the optical axis direction is a concentric ring shape of which the center is the optical axis, and a cross-sectional shape including the optical axis is a serrated shape. The projecting section has: a first surface into which the light emitted from the light source enters and that refracts the light that has entered; a second surface formed in an outer side position in the radial direction with reference to the optical axis in relation to the first surface and that totally reflects the light that has entered from the first surface towards the exit area; and a third surface disposed between the first surface and the second surface such as to be joined with an end section on the light source side of both the first surface and the second surface, into which the light emitted from the light source enters. The third surface is formed into an angled surface that is angled in relation to the optical axis, of which one end section joined with the first surface is positioned further to the light source side in the optical axis direction than another end section joined with the second surface. The light that has entered the third surface of each of the plurality of projecting sections is refracted to the exit area side with positive power by the third surfaces as a whole.

In the first aspect of the invention, a design that is not difficult to manufacture can be achieved in which the sharpness of the projecting section is relaxed, as a result of the third surface being sandwiched between the first surface and the second surface. Because the third surface is formed into an angled surface such as to have positive power by the plurality of third surfaces as a whole, the light that has entered the third surface can be guided directly onto an optical path towards the surface to be irradiated, without total reflection by the second surface. As a result, generation of unnecessary light can be easily suppressed with certainty, and the light emitted from the light source can be used with sufficient efficiency. Therefore, manufacturability and yield can be improved.

A light beam controlling member according to a second aspect is a light beam controlling member including: an incident area into which light emitted from a light source enters; and a counter-incident area positioned on the side opposite to the incident area in the optical axis direction and into which the light that has entered the incident area internally enters, that totally reflects light of which an angle of incidence is greater than a critical angle, among the internally incident light, towards an outer side in a radial direction. The light totally reflected by the counter-incident area travels towards a surface to be irradiated. The incident area has a plurality of projecting sections that are adjacent to one another in the radial direction, such that a shape when viewed from the optical axis direction is a concentric ring shape of which the center is the optical axis, and a cross-sectional shape including the optical axis is a serrated shape. The projecting section has: a first surface into which the light emitted from the lights source enters and that refracts the light that has entered; a second surface formed in an outer side position in the radial direction with reference to the optical axis in relation to the first surface and that totally reflects the light that has entered from the first surface towards the counter-incident area; and a third surface disposed between the first surface and the second surface such as to be joined with an end section on the light source side of both the first surface and the second surface, into which the light emitted from the light source enters. The third surface is formed into an angled surface that is angled in relation to the optical axis, of which one end section joined with the first surface is positioned further to the light source side in the optical axis direction than another end section joined with the second surface. The light that has entered the third surface of each of the plurality of projecting sections is refracted to the exit area side with positive power by the third surfaces as a whole.

In the second aspect of the invention, a design that is not difficult to manufacture can be achieved in which the sharpness of the projecting section is relaxed, as a result of the third surface being sandwiched between the first surface and the second surface. Because the third surface is formed into an angled surface such as to have positive power by the plurality of third surfaces as a whole, the light that has entered the third surface can be guided directly onto an optical path towards the counter-incident area, without total reflection by the second surface, and totally reflected by the counter-incident area towards the surface to be irradiated. As a result, generation of unnecessary light can be easily suppressed with certainty, and the light emitted from the light source can be used with sufficient efficiency. Therefore, manufacturability and yield can be improved.

A light beam controlling member according to a third aspect is the light beam controlling member according to claim 1 or 2, in which the third surface refracts the light that has entered the third surface in a direction towards the exit area or the counter-incident area, such that the light enters neither the first surface nor the second surface.

In the third aspect of the invention, the function of the third surface that guides the light emitted from the light source onto the optical path towards the surface to be irradiated can be prevented from being inhibited by the first surface or the second surface. Therefore, generation of the unnecessary light can be suppressed with further certainty, and efficiency of light utilization can be further improved.

A light beam controlling member according to a fourth aspect is the light beam controlling member according to claim 1 or 2, in which a following conditional expression (1) is met:

$$\theta1<\theta2<90° \tag{1}$$

(where, $\theta1$ represents an angle formed by a direction of refraction from the first surface of the light that has entered the first surface, and the first surface; and $\theta2$ represents an angle formed by the first surface and the third surface.)

In the fourth aspect of the invention, the light that has entered the first surface can be prevented from being totally reflected by the third surface. Therefore, generation of the unnecessary light can be more effectively prevented.

A light beam controlling member according to a fifth aspect is the light beam controlling member according to claim 3, in which a following conditional expression (1) is met:

$$\theta1<\theta2<90° \tag{1}$$

(where, $\theta1$ represents an angle formed by a direction of refraction from the first surface of the light that has entered the first surface, and the first surface; and $\theta2$ represents an angle formed by the first surface and the third surface.)

In the fifth aspect of the invention, the light that has entered the first surface can be prevented from being totally reflected by the third surface. Therefore, generation of the unnecessary light can be more effectively prevented.

An optical device according to a sixth aspect of the invention is an optical device that irradiates light emitted from a light source onto a surface to be irradiated. In the optical device, the light beam controlling member according to any one of the first to fifth aspects is disposed in a position on a light-emitting side of the light source, in a state in which the incident area thereof faces the light source side, and the optical axis thereof is positioned to be aligned with a center axis of the light emitted from the light source.

In the sixth aspect of the invention, generation of unnecessary light can be easily suppressed with certainty, and the light emitted from the light source can be used with sufficient efficiency. Therefore, manufacturability and yield can be improved.

An optical device according to a seventh aspect is the optical device according to the sixth aspect, in which the third surface is disposed within a region of the incident area in which light emitted from the light source at an angle of 45° or less in relation to the optical axis enters.

In the seventh aspect of the invention, because the third surface is disposed within a region of the incident area in which the light emitted from the light source can appropriately enter the third surface, the third surface can be function effectively.

Effect of the Invention

In the present invention, deterioration of light distribution characteristics caused by unnecessary light can be easily suppressed with certainty, using a design that is not difficult to manufacture. In addition, efficiency of light utilization can be improved.

Figure 1:
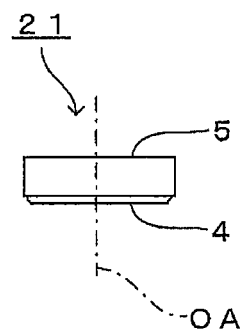
FIG. 1 is a front view of a light beam controlling member according to a first embodiment of the present invention.

EXPLANATIONS OF LETTERS OR NUMERALS 4 incident area
5 exit area
11 projecting section
14 first surface
15 second surface
21 light beam controlling member
23 third surface

BEST MODE(S) FOR CARRYING OUT THE INVENTION

First Embodiment

A first embodiment of the present invention will hereinafter be described with reference to FIG. 1 to FIG. 5.

Sections of which the basic configuration is the same or similar to that of the conventional light beam controlling members 1, 1', and 1" shown in FIG. 11 to FIG. 16 are described using the same reference numbers.

Figure 2:
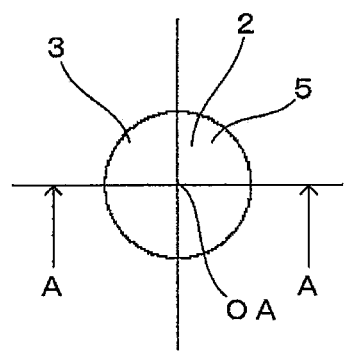
FIG. 2 is a planar view of FIG. 1.
Figure 3:
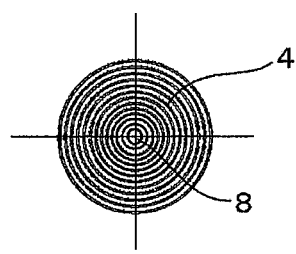
FIG. 3 a bottom view of FIG. 1.
Figure 4:
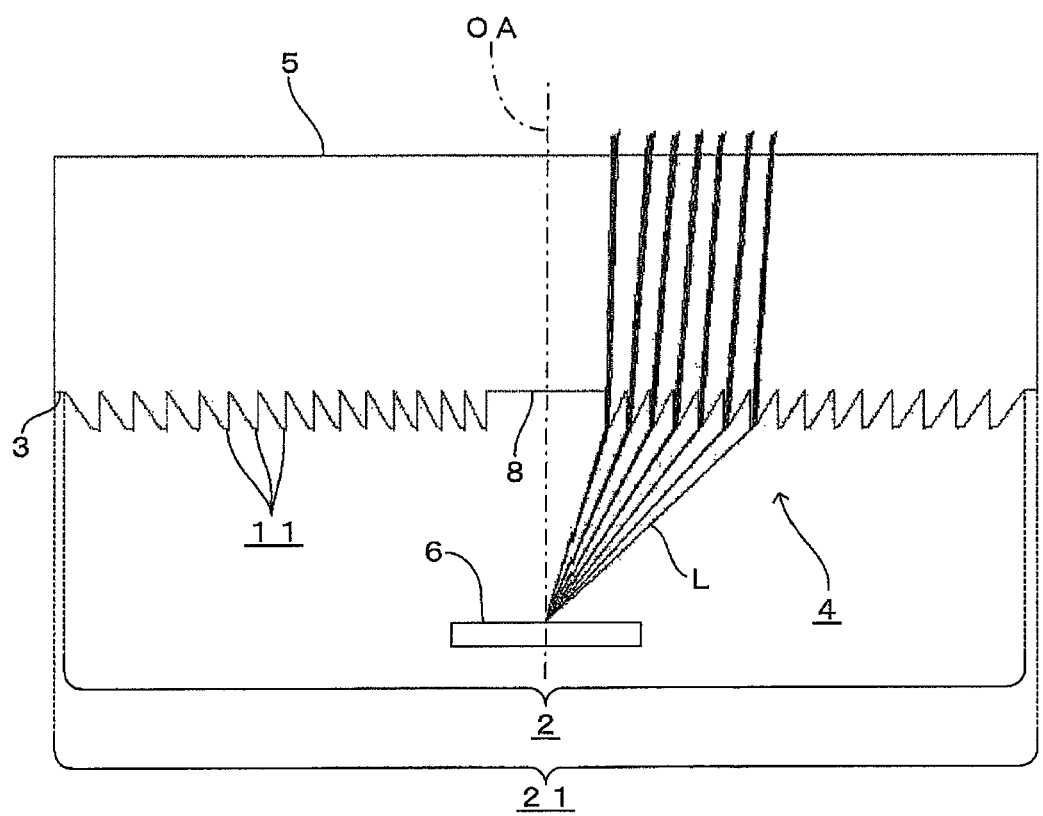
FIG. 4 is a configuration diagram of a cross-section taken along line A-A in FIG. 2 and a light source.

Here, FIG. 1 is a front view of a light beam controlling member 21 according to the first embodiment. FIG. 2 is a planar view of FIG. 1. FIG. 3 is a bottom view of FIG. 1. FIG. 4 is a cross-sectional view taken along line A-A in FIG. 2 that also shows a light source 6. FIG. 4 is equivalent to a configuration diagram of an overview of an optical device according to the first embodiment.

Figure 5:
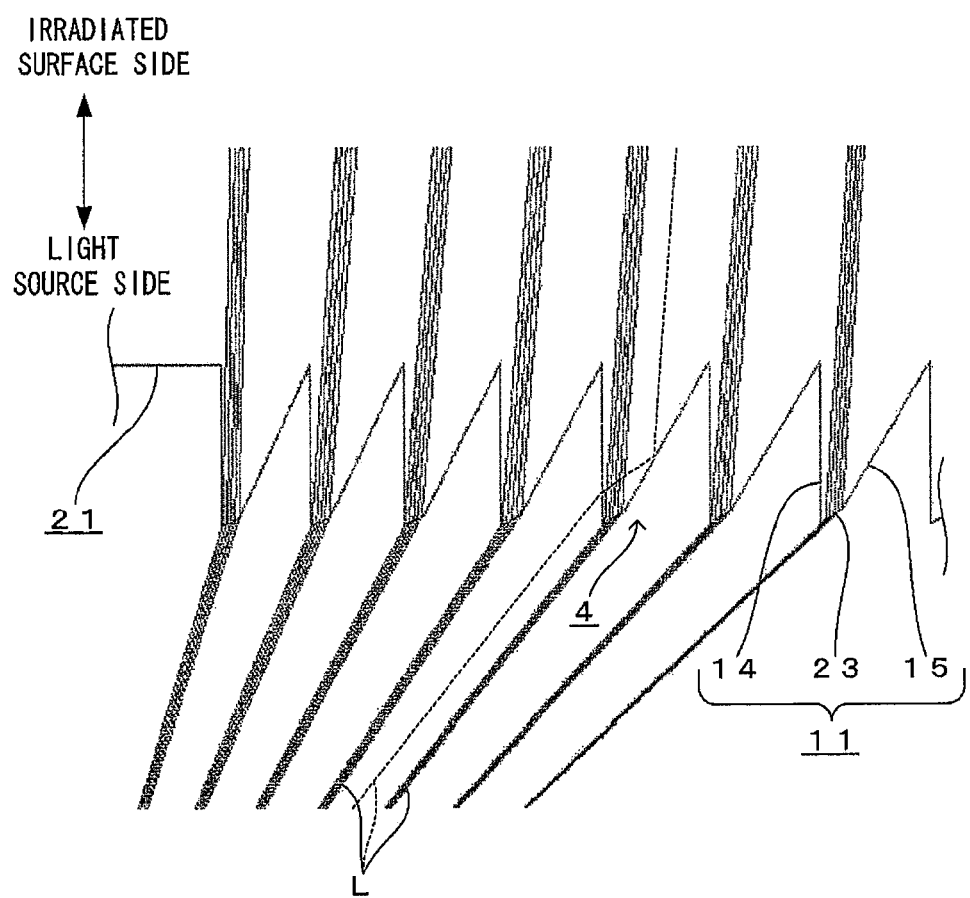
FIG. 5 is an enlarged view of first main sections in FIG. 4.

FIG. 5 is an enlarged view of main sections in FIG. 4.

As shown in FIG. 1 to FIG. 4, the light beam controlling member 21 according to the first embodiment is configured by the light beam controlling section 2 that has a circular shape from a planar view, and the cylindrical edge section 3 that surrounds the light beam controlling section 2. The light beam controlling section 2 is similar to those of the conventional light beam controlling members 1, 1', and 1" in that the incident area 4 having a Fresnel shape and the exit area 5 positioned on the side opposite to the incident area 4 in the optical axis OA direction are included.

As shown in FIG. 4, the light beam controlling member 21 according to the first embodiment configures an optical device according to the first embodiment by the light source 6 (a point light source having a predetermined light-emitting area) that emits light having a predetermined spread angle, such as an LED, being disposed in a position facing the incident area 4 in the optical axis OA direction, in a state in which the light source 6 is positioned such that the center axis of the emitted light is aligned with the optical axis OA of the light beam controlling member 21, as shown in FIG. 4. The light beam controlling member 21 controls the outgoing light beam from the light source 6 and irradiates the light beam onto a surface to be irradiated.

However, in the light beam controlling member 21 according to the first embodiment, the plurality of projecting sections 11 of the incident area 4 that is formed into the Fresnel shape includes a characteristic configuration not found in conventional technology.

In other words, as shown in FIG. 5, according to the first embodiment, the projecting section 11 includes the above-described first surface 14 and second surface 15, and also includes a third surface 23 disposed between the first surface 14 and the second surface 15 such as to be joined with the respective end sections on the light source 6 side of the first surface 14 and the second surface 15. Although the first surface 14 and the second surface 15 are given the same reference numbers as those of the conventional light beam controlling members 1, 1', and 1", the angles of the first surface 14 and the second surface 15 in relation to the optical axis OA may be the same as those of the conventional light beam controlling members 1, 1', and 1" or may differ. The height of the projecting section 11 can be formed shorter (for example, 0.08 mm) than the height (for example, 0.1 mm) of the conventional projecting section 11 shown in FIG. 11 and FIG. 12.

Here, as shown in FIG. 5, the third surface 23 is formed into an angled surface (tapered surface) at an angle in relation to the optical axis OA, such that one end section (left end section in FIG. 5) joined with the first surface 14 is positioned closer to the light source 6 side in the optical axis OA direction than the other end section (right end section in FIG. 5) joined with the second surface 15. The third surface 23 of each projecting section 22 is formed into an angled surface such as to have positive power by the plurality of third surfaces as a whole. An optical path of incident light within the light beam controlling member 12 when, for example, light parallel to the optical axis OA enters all third surfaces 23 of the light beam controlling member 21 is an optical path that approaches the optical axis OA. As long as the surface has such characteristics, the third surface 23 may be a curved surface, in addition to a linear surface.

Figure 11:
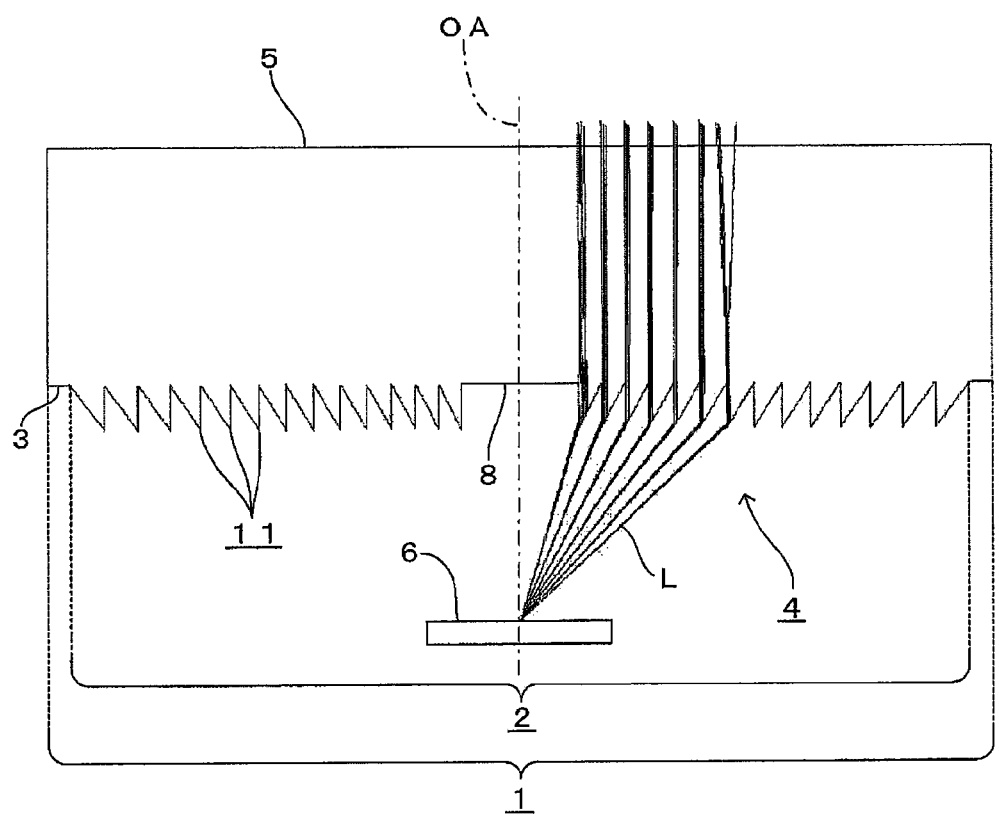
FIG. 11 is a cross-sectional view of an example of a design for an ideal light beam controlling member.
Figure 12:
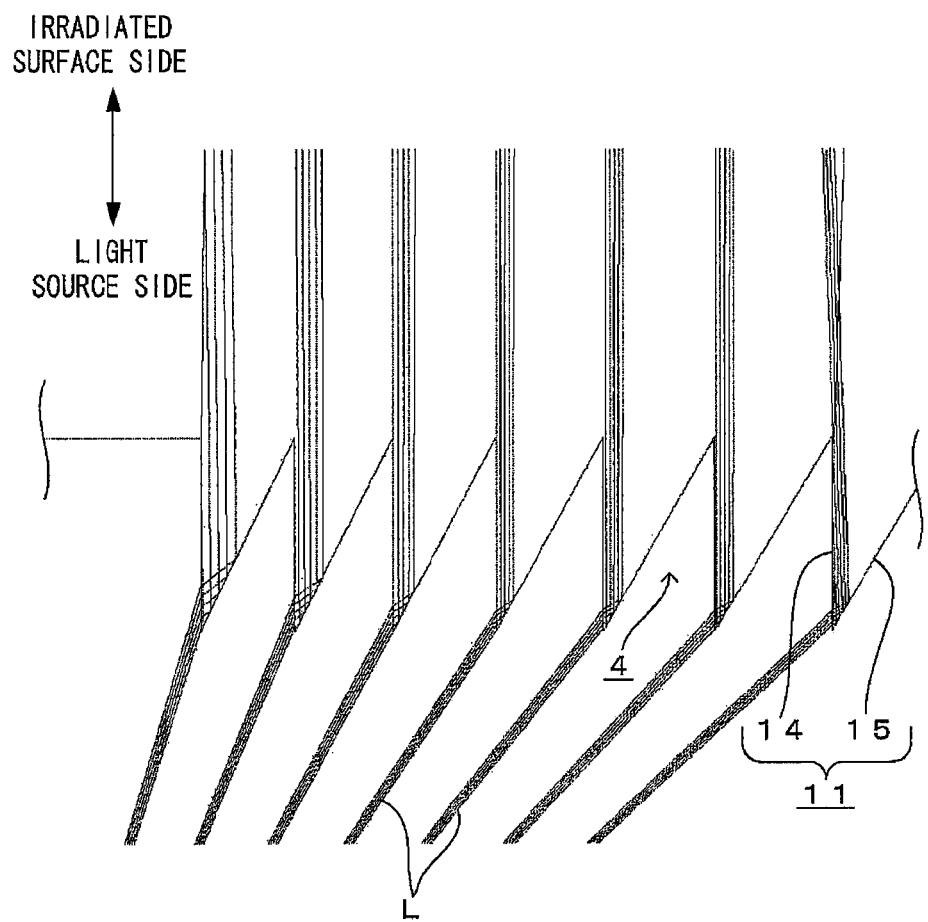
FIG. 12 is an enlarged view of main sections in FIG. 11.
Figure 13:
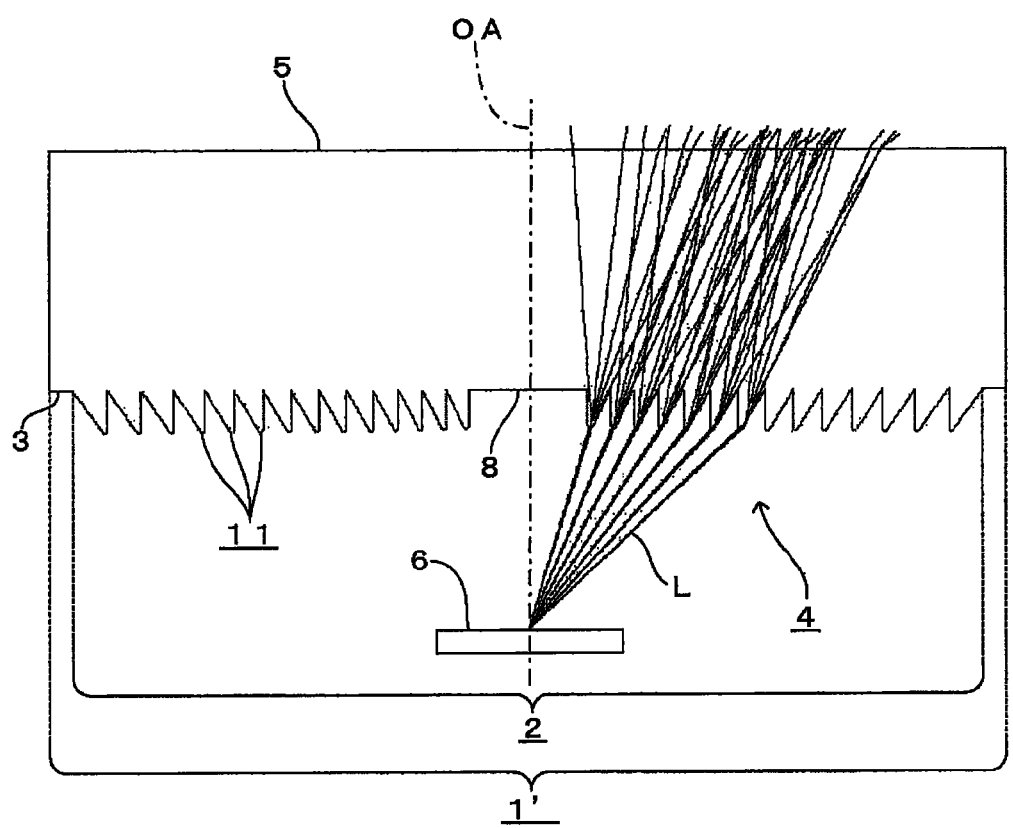
FIG. 13 is a cross-sectional view of a light beam controlling member in which molding defect has occurred as a result of insufficient filling of resin material.
Figure 14:
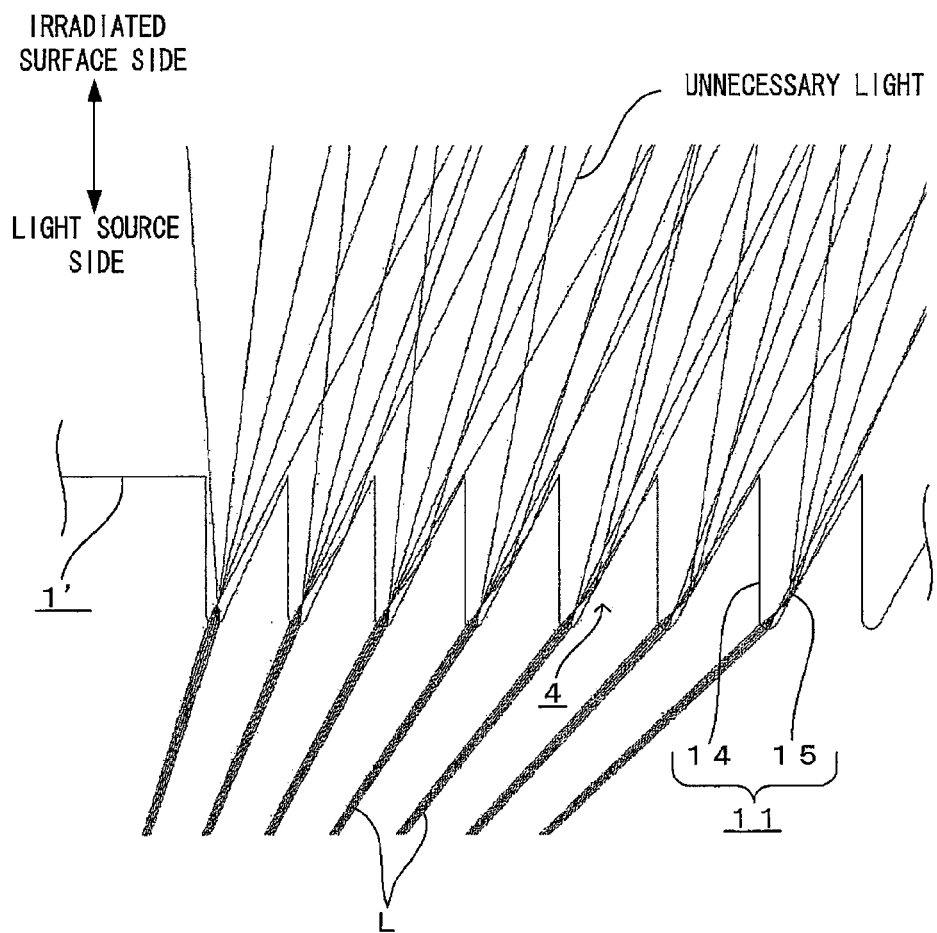
FIG. 14 is an enlarged view of main sections in FIG. 13.
Figure 15:
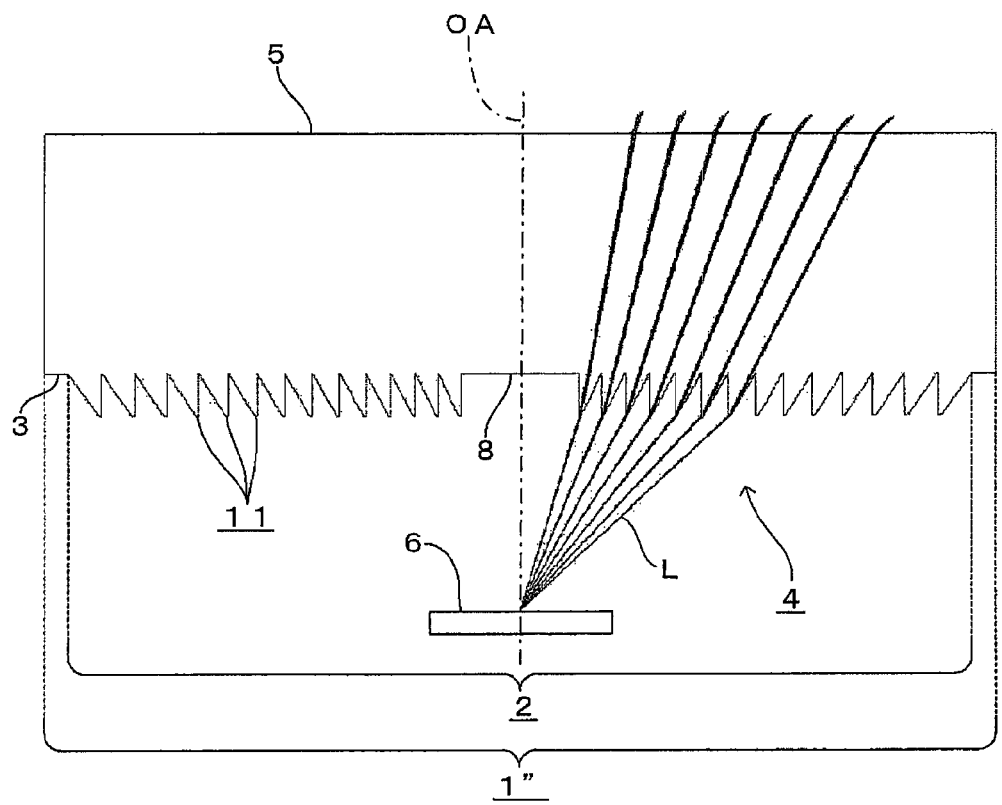
FIG. 15 is a configuration diagram of a light beam controlling member of which design changes have been made from an ideal shape.
Figure 16:
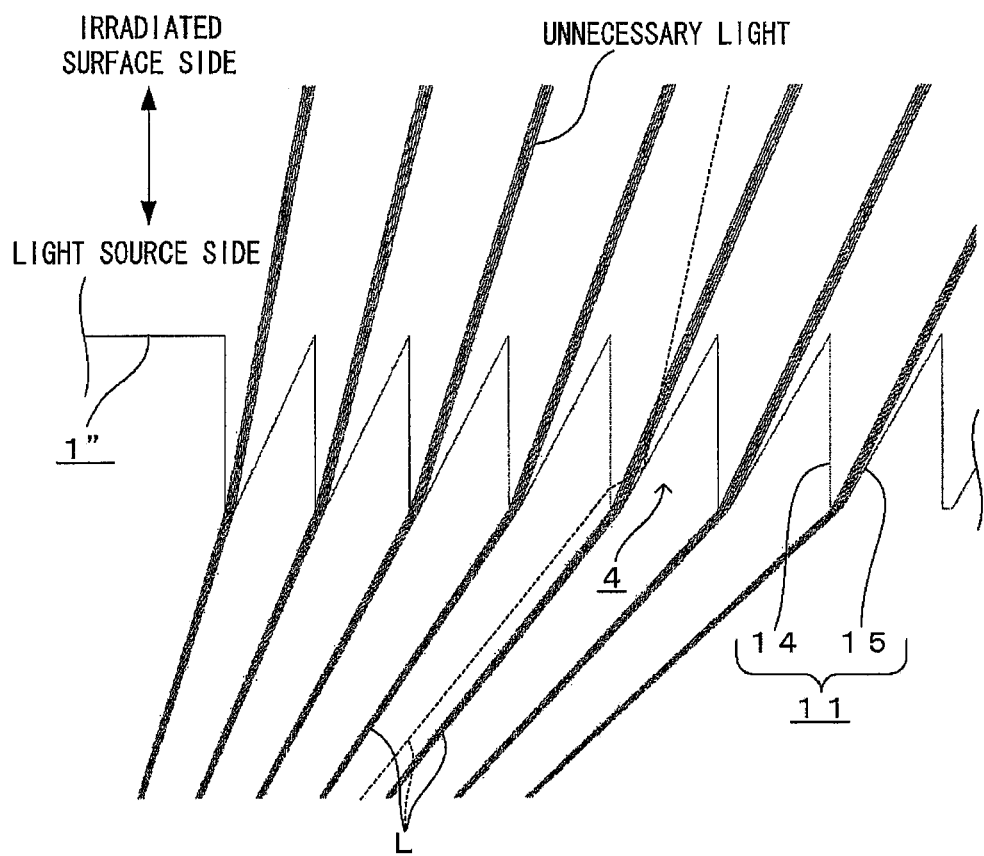
FIG. 16 is an enlarged view of main sections in FIG. 15.

As a result of the projecting section 11 being formed as described above, a peak angle of the tip end section of the projecting section 11 can be formed greater than that of the conventional projecting section 11 shown in FIG. 11 and FIG. 12.

In other words, according to the first embodiment, in addition to reducing the height of the projecting section 11, the peak angle of the projecting section 11 can be increased, thereby achieving a product shape facilitating transfer of a mold shape during formation.

Next, light beam control performed by the first surface 14, the second surface 15, and the third surface 23 on light emitted from the center of the light source 6 having a predetermined light-emitting area (intersection between a light-emitting surface of the light source 6 and the optical axis OA) will be described.

Light that are adjacent to each other, among the light emitted from the light source 6, respectively enter the first surface 14 and the third surface 23 at differing angles of incidence. The light that has entered the first surface 14 and the light that has entered the third surface 23 are refracted by the respective surfaces 14 and 23 in adherence to Snell's law, and travel over optical paths within the projecting section 11.

Specifically, the light that has entered the first surface 14 enters the second surface 15 at an angle of incidence that is a critical angle or more, and is totally reflected by the second surface 15 towards the exit area 5. The broken line in FIG. 5 indicates one optical path of light L that is emitted from the light source 6 and enters the first surface 14, as that described above.

On the other hand, as shown in FIG. 5, the light L that has been emitted from the light source 6 and has entered the third surface 23 (solid line in FIG. 5) is refracted towards the exit area 5 side with positive power by the third surfaces 23 as a whole.

Therefore, according to the first embodiment, as a result of the third surface 23 being sandwiched between the first surface 14 and the second surface 15, a design that is not difficult to manufacture and in which the sharpness of the projecting section 11 is relaxed can be achieved. In addition, as a result of the third surface 23 being an angled surface such as to have positive power by the plurality of third surfaces as a whole, the light L that has entered the third surface 23 can be directly guided onto the optical path towards the surface to be irradiated, without total reflection of the light L by the second surface 15. The foregoing also apparent from the optical path indicated by the solid line section being almost parallel with the optical path indicated by the broken line section within the projecting section 11 in FIG. 5. As a result, generation of unnecessary light can be easily suppressed with certainty, and the light emitted from the light source 6 can be used with sufficient efficiency. Therefore, manufacturability and yield can be improved.

In addition, as shown in FIG. 5, according to the first embodiment, each third surface 23 is configured to refract the light L entering the third surface 23 in the direction towards the exit area 5 such that the light L enters neither the first surface 14 nor the second surface 15.

As a result of a configuration such as this, the function of the third surface 23 that guides the light emitted from the light source 6 onto the optical path towards the surface to be irradiated can be prevented from being inhibited by the first surface 14 or the second surface 15. Therefore, generation of the unnecessary light can be suppressed with further certainty, and efficiency of light utilization can be further improved.

Figure 6:
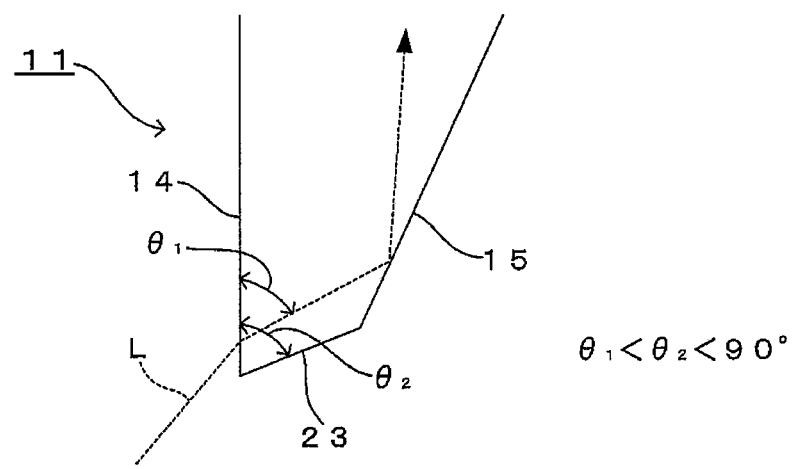
FIG. 6 is an enlarged view of second main sections in FIG. 4.

Furthermore, as shown in FIG. 6, according to the first embodiment, the light beam controlling member 21 satisfies the following conditional expression (1).

$$\theta_1 < \theta_2 < 90° \quad (1)$$

Here, θ1 in expression (1) represents an angle [°] formed by the direction of refraction from the first surface 14 of the light L (broken line section) that has been emitted from the light source 6 and has entered the first surface 14, and the first surface 14, as shown in FIG. 6. In addition, θ2 in expression (1) represents an angle [°] formed by the first surface 14 and the third surface 23, as shown in FIG. 6. For example, in the projecting section 11 closest to the optical axis OA, θ1=53° and θ2=71°.

As a result of a configuration such as that described above, the light that has entered the first surface 14 can be prevented from being totally reflected by the third surface 23. Therefore, generation of unnecessary light can be further effectively prevented.

In addition, each third surface 23 may be disposed within a region of the incident area 4 in which light emitted from the light source 6 at an angle of 40° to 45° or less in relation to the optical axis OA enters.

As a result, the third surface 23 can be disposed within a region of the incident area 4 in which the light that has been emitted from the light source 6 can appropriately enter the third surface 23, thereby enabling the third surface 23 to function effectively.

In addition, when the formation region of the third surface 23 is set depending on the angle of emission of the light from the light source 6 as described above, because a typical LED has light distribution characteristics of the Lambert scattering in which the amount of emitted light increases at an angle of emission of 30° to 60°, a lower limit of the formation region of the third surface 23 (inner end in the radial direction) may be a position in the incident area 4 in which light that has been emitted from the light source 6 at an angle of emission of 30° enters, taking into consideration efficiency of light utilization. When the incident area 4 is configured in this way, such that the third surface 23 is formed in the projecting section 11 in a position where at least light of a region having a large amount of light emitted from the light source 6 enters, the direction of the light entering the area can be controlled with certainty. Therefore, even if the third surfaces 23 are not formed in the projecting sections 11 over the entire area of the incident area 4, efficiency of light utilization can be improved from that of the light beam controlling member 1' with a molding defect shown in FIG. 14.

Furthermore, in addition to the above-described configurations, for example, a predetermined number of projecting sections 11 near the optical axis OA, among the plurality of projecting sections 11, may be disposed facing a position further inwards in the radial direction than the end section in the radial direction on the light-emitting surface of the light source 6. As a result of a configuration such as this, in a thin optical device in which the light source 6 is disposed in the immediate vicinity of the light beam controlling member 21, favorable light distribution characteristics and efficiency of light utilization can be achieved with certainty.

Second Embodiment

Next, a second embodiment of the present invention will be described with reference to FIG. 7 to FIG. 10, focusing mainly on differences with the first embodiment.

Sections of which the basic configuration is the same or similar to that according to the first embodiment are described using the same reference numbers.

Figure 7:
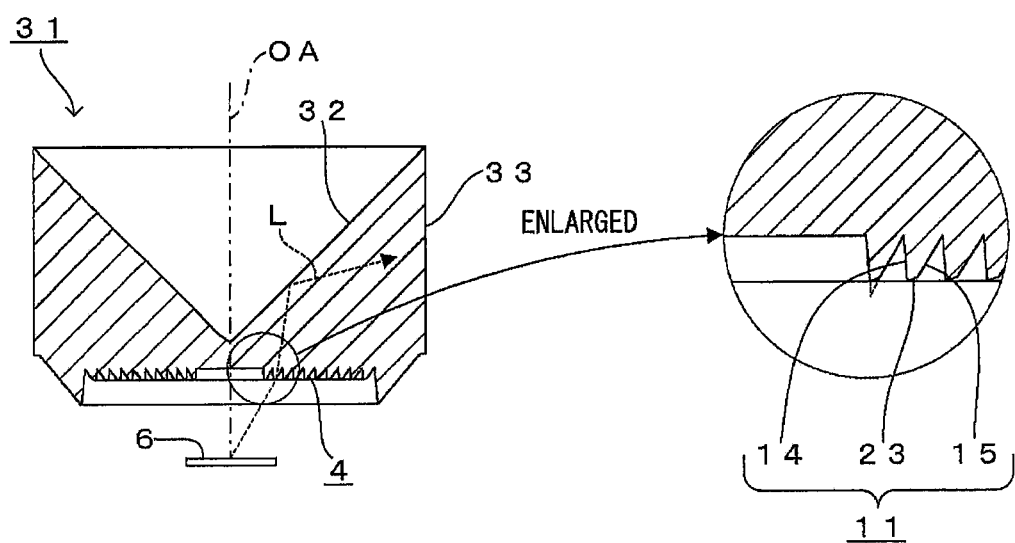
FIG. 7 is a cross-sectional view of a light beam controlling member according to a second embodiment of the present invention.

FIG. 7 is a vertical cross-sectional view of a light beam controlling member 31 according to the second embodiment that also shows the optical axis OA, and is an enlarged view of the main sections of the light beam controlling member 31. As shown in FIG. 7, in the light beam controlling member 31 according to the second embodiment, the basic configuration of the incident area 4 is similar to that in the light beam controlling member 21 according to the first embodiment. In other words, in a manner similar to that according to the first embodiment, in the light beam controlling member 31 according to the second embodiment as well, the projecting section 11 in the incident area 4 having the Fresnel shape has the first surface 14, the second surface 15, and the third surface 23. The first surface 14, the second surface 15, and the third surface 23 according to the second embodiment are also configured to perform light beam control similar to that performed by the first surface 14, the second surface 15, and the third surface 23 according to the first embodiment on the Lambertian-scattered light L emitted from the light source 6 that is disposed in a position facing the incident area 4 in the optical axis OA direction.

However, according to the second embodiment, the optical path of the light from the light source 6 after control by the first surface 14, the second surface 15, and the third surface 23 differs from that according to the first embodiment, as a result of the shape of the light beam controlling member 31 unique to the second embodiment.

In other words, in the light beam controlling member 31 according to the second embodiment, a counter-incident area 32 positioned on the side opposite to the incident area 4 in the optical axis OA direction is not specialized for the emission of light towards the surface to be irradiated, unlike as the exit area 5 according to the first embodiment.

Specifically, as shown in FIG. 7, the counter-incident area 32 is formed into a conical tapered surface having a predetermined tilt angle (taper angle that is twice the tilt angle) in relation to the optical axis OA and of which the rotational symmetry axis is the optical axis OA. The inner diameter of the counter-incident area 32 gradually increases towards the side opposite to the incident area 4 (upwards in FIG. 7) in the optical axis OA direction.

The tilt angle of the counter-incident area 32 is preferably 45° (taper angle is 90°). As shown in FIG. 7, the light L from the light source 6 that has traveled on the optical path within the light beam controlling member 31 after total reflection by each second surface 15 or positive-power refraction by each third surface 23 internally enters the counter-incident area 32 configured as described above. The counter-incident area 32 totally reflects the light L of which the angle of incidence is greater than a critical angle, among the internally incident light L, towards the outer side in the radial direction with a reflective angle based on the angle of incidence.

The light L that has been totally reflected by the counter-incident area 32 in this way changes optical path towards an outer peripheral surface 33 (or in other words, the exit area) disposed on the outer side in the radial direction in relation to the counter-incident area 32 and the incident area 4.

In the configuration according to the second embodiment in which the optical path of the light L such as that described above is formed, generation of unnecessary light is suppressed with certainty by the first surface 14, the second surface 15, and the third surface 23. The total reflection direction of the light L from the counter-incident area 32 can be appropriately controlled. In addition, in an instance in which light beam control is required that targets desired light distribution characteristics such that illumination intensity towards the side of the light beam controlling member (outer side in the radial direction) increases, according to the second embodiment, the desired light distribution characteristics can be achieved with certainty.

To achieve the light distribution characteristics such that illumination intensity towards the side of the light beam controlling member 31 increases in this way, the light distribution characteristics of the incident area 4 are preferably controlled to a half-bandwidth of 10° or less.

In the configuration in FIG. 7, the outer end in the radial direction of the light beam controlling member 31 is set as the outer peripheral surface 33, and the outer peripheral surface 33 serves as the exit area. However, the second embodiment can also be effectively applied to a configuration in which light guiding sections (such as a light guiding plates) (not shown) that guide the light L further to the side are connected, instead of the outer peripheral surface 33. In this instance, depending on the configuration of the light guiding sections, the emission direction of the light L from the light beam controlling member 31 may be parallel with the optical axis OA direction.

Furthermore, in the configuration shown in FIG. 7, the counter-incident area 32 is formed into the linear tapered shape in which the outer shape (generating line) formed by the vertical cross-section including the optical axis OA is a straight line that tilts outward in the radial direction towards the side opposite to the incident area 4, taking into consideration ease of design and manufacturing. However, in an instance in which focus is placed on increasing the amount of light totally reflected by the counter-incident area 32, the generating line of the counter-incident area 32 may be formed into a curved line capable of optimizing or improving the angle of incidence. However, depending on the concept, a design can also be made in which desired light distribution characteristics are achieved in which a certain amount of leaked light is intentionally formed in the counter-incident area 32 and a slight degree of illumination intensity is found in the optical axis OA direction as well.

As shown by the broken line section in the enlarged view in FIG. 7, as described earlier, forming the tip end section of the projecting section 11 into a sharp shape is not realistic in terms of formation using a mold.

EXAMPLE

Figure 8:
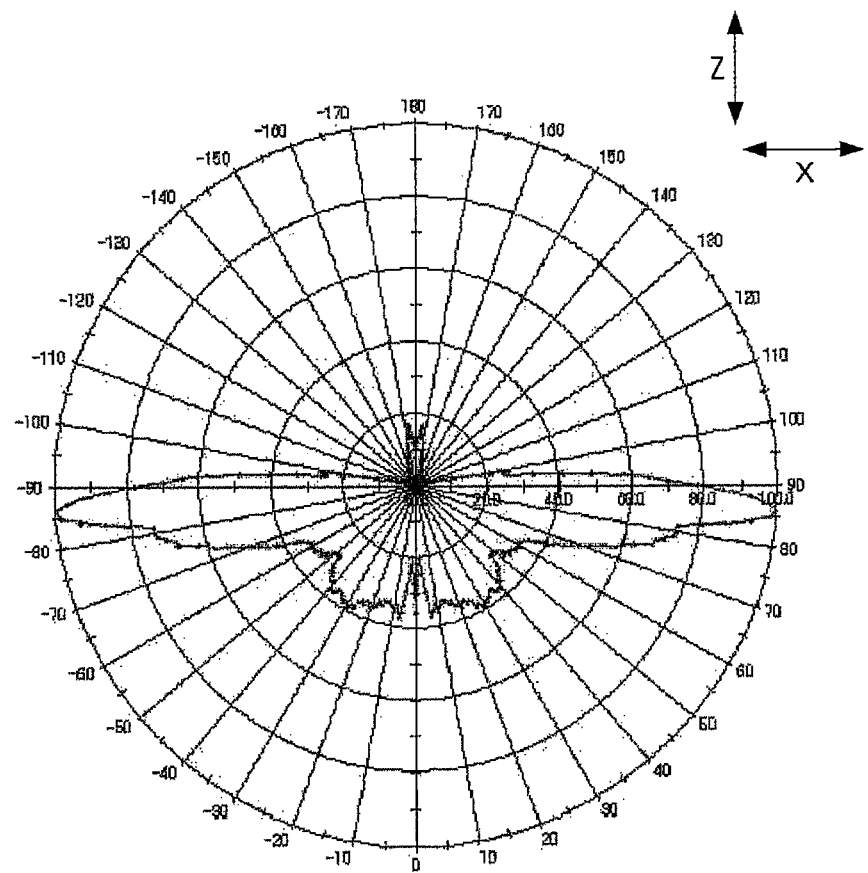
FIG. 8 is a graph showing light distribution characteristics of the light beam controlling member as an example according to the second embodiment.

Next, FIG. 8 shows simulation results of distribution of light intensity (in other words, light distribution characteristics) of the light emitted from the light beam controlling member 31 as a graph on an XZ plane that is a virtual plane including the optical axis OA. On the XZ plane, the X direction is the radial direction of the light beam controlling member 31 and the Z direction is the optical axis OA direction. In addition, the angle 0° indicated at the bottommost end of the graph in FIG. 8 is equivalent to the front (upper side in FIG. 7) in the optical axis OA direction. Furthermore, the center point (point of origin) of the graph in FIG. 8 indicates the position of the light beam controlling member 31 under an premise that the light beam controlling member 31 is viewed from an infinite distance. The light distribution characteristics in FIG. 8 such as that described above indicate rotational symmetry of almost 360° around the optical axis OA. In the light beam controlling member 31 corresponding to the light distribution characteristics in FIG. 8, the height of the projecting section 11 is 0.08 mm, and $\theta 1=53°$ and $\theta 2=71°$ in expression (1).

Here, as shown in FIG. 8, the light distribution characteristics of the light beam controlling member 31 clearly indicate that the intensity of the emitted light is at a maximum value (peak intensity) in the direction that is almost ±86° with reference to the optical axis OA as the side of the light beam controlling member 31. On the other hand, on the front side of the light beam controlling member 31 as well, a slight degree of light intensity equivalent to light leakage in the counter-incident area 32 can be recognized. However, the light intensity is clearly kept to a lower value (a degree that does not cause problems during actual use) compared to the light intensity on the side. The light beam controlling member 31 such as this can be considered suitable for achieving light distribution characteristics indicating the peak value of light intensity in the direction near ±80° to 110°.

Figure 9:
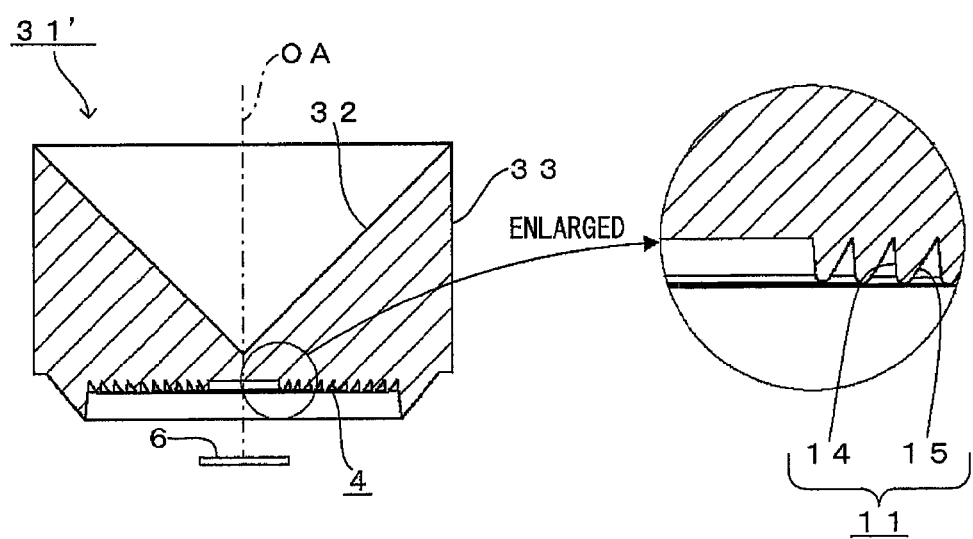
FIG. 9 is a cross-sectional view of a light beam controlling member in which molding defect has occurred, as a comparative example according to the second embodiment.
Figure 10:
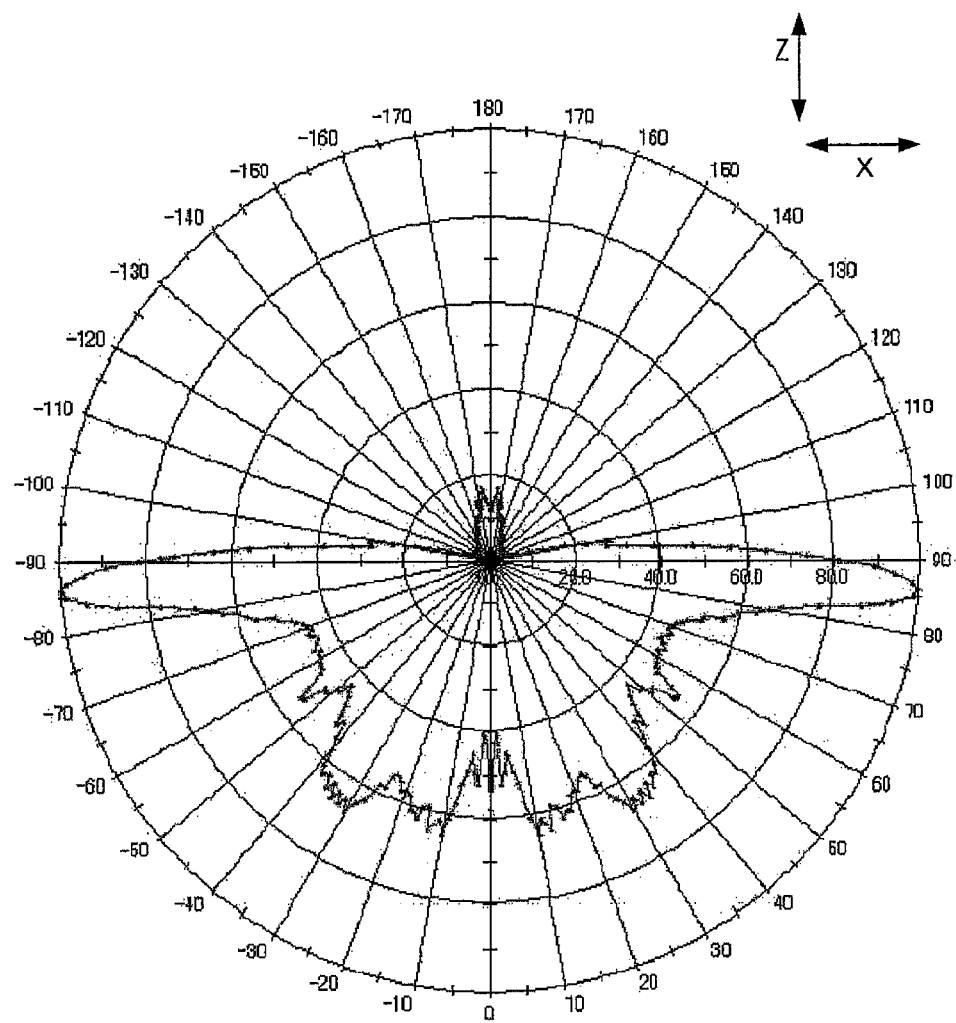
FIG. 10 is a graph showing light distribution characteristics of the light beam controlling member in FIG. 9.

On the other hand, FIG. 9 shows a configuration 31' to which the present invention is applied to the projecting section 11 with molding defects (see FIGS. 13 and 14) as a comparative example. The light distribution characteristics achieved by the light beam controlling member 31' such as this are shown in FIG. 10. In other words, in the light distribution characteristics in FIG. 10, the degree of illumination intensity on the front side of the light beam controlling member 31' is significantly greater than that in FIG. 8. A significant amount of light (unnecessary light) leakage has clearly occurred in the counter-incident area 32. This is thought to have occurred as a result of the light beam controlling member 31' in FIG. 9 not being able to appropriately control light in the incident area 4, thereby generating unnecessary light.

The present invention is not limited to the above-described embodiments, and various modifications can be made without compromising the features of the present invention.

For example, the light beam controlling member 21 according to the first embodiment can be effectively applied to spotlight-system lighting, such as lighting in a store window or a light (flash) for an imaging camera mounted on a mobile phone.

The invention claimed is:

1. A light beam controlling member comprising:
    an incident area into which light emitted from a light source enters; and
    an exit area positioned on a side opposite to the incident area in an optical axis direction that emits the light that has entered the incident area towards a surface to be irradiated, wherein
    the incident area has a plurality of projecting sections that are adjacent to one another in a radial direction, such that a shape when viewed from the optical axis direction is a concentric ring shape of which the center is the optical axis, and a cross-sectional shape including the optical axis is a serrated shape, and
    the projecting section has
        a first surface into which the light emitted from the light source enters and that refracts the light that has entered;
        a second surface formed in an outer side position in the radial direction with reference to the optical axis in relation to the first surface and that totally reflects the light that has entered from the first surface towards the exit area; and
        a third surface disposed between the first surface and the second surface such as to be joined with an end section on the light source side of both the first surface and the second surface, into which the light emitted from the light source enters, and
        the third surface is formed into an angled surface that is angled in relation to the optical axis, of which one end section joined with the first surface is positioned further to the light source side in the optical axis direction than another end section joined with the second surface, and the light that has entered the third surface of each of the plurality of projecting sections is refracted to the exit area side with positive power by the third surfaces as a whole.

2. A light beam controlling member comprising:
    an incident area into which light emitted from a light source enters; and
    a counter-incident area positioned on the side opposite to the incident area in the optical axis direction and into which the light that has entered the incident area internally enters, that totally reflects light of which an angle of incidence is greater than a critical angle, among the internally incident light, towards an outer side in a radial direction, wherein
    the light totally reflected by the counter-incident area travels towards a surface to be irradiated,
    the incident area has a plurality of projecting sections that are adjacent to one another in the radial direction, such that a shape when viewed from the optical axis direction is a concentric ring shape of which the center is the optical axis, and a cross-sectional shape including the optical axis is a serrated shape, and
    the projecting section has
        a first surface into which the light emitted from the light source enters and that refracts the light that has entered;
        a second surface formed in an outer side position in the radial direction with reference to the optical axis in relation to the first surface and that totally reflects the light that has entered from the first surface towards the counter-incident area; and
        a third surface disposed between the first surface and the second surface such as to be joined with an end section on the light source side of both the first surface and the second surface, into which the light emitted from the light source enters, and
        the third surface is formed into an angled surface that is angled in relation to the optical axis, of which one end section joined with the first surface is positioned further to the light source side in the optical axis direction than another end section joined with the second surface, and the light that has entered the third surface of each of the plurality of projecting sections is refracted to the exit area side with positive power by the third surfaces as a whole.

3. The light beam controlling member according to claim 1 or 2, wherein the third surface refracts the light that has entered the third surface in a direction towards the exit area or the counter-incident area, such that the light enters neither the first surface nor the second surface.

4. The light beam controlling member according to claim 1 or 2, wherein a following conditional expression (1) is met:

$$\theta 1 < \theta 2 < 90° \quad (1)$$

where,
    $\theta 1$: an angle formed by a direction of refraction from the first surface of the light that has entered the first surface, and the first surface; and
    $\theta 2$: an angle formed by the first surface and the third surface.

5. The light beam controlling member according to claim 3, wherein a following conditional expression (1) is met:

$$\theta 1 < \theta 2 < 90° \quad (1)$$

where,
    $\theta 1$: an angle formed by a direction of refraction from the first surface of the light that has entered the first surface, and the first surface; and
    $\theta 2$: an angle formed by the first surface and the third surface.

6. An optical device that irradiates light emitted from a light source onto a surface to be irradiated, wherein:
    the light beam controlling member according to claim 1 or 2 is disposed in a position on a light-emitting side of the light source, in a state in which the incident area thereof faces the light source side, and the optical axis thereof is positioned to be aligned with a center axis of the light emitted from the light source.

7. The optical device according to claim 6, wherein the third surface is disposed within a region of the incident area in which light emitted from the light source at an angle of 45° or less in relation to the optical axis enters.

* * * * *